US012032578B1

(12) United States Patent
Bensberg et al.

(10) Patent No.: US 12,032,578 B1
(45) Date of Patent: Jul. 9, 2024

(54) DATA COMPRESSION, STORE, AND SEARCH SYSTEM

(71) Applicant: SAP SE, Walldorf (DE)

(72) Inventors: Christian Bensberg, Heidelberg (DE); Frederik Transier, Bammental (DE); Kai Stammerjohann, Wiesloch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/100,625

(22) Filed: Jan. 24, 2023

(51) Int. Cl.
*G06F 16/2455* (2019.01)
*G06F 16/2457* (2019.01)
*G06F 16/248* (2019.01)

(52) U.S. Cl.
CPC .. *G06F 16/24561* (2019.01); *G06F 16/24573* (2019.01); *G06F 16/248* (2019.01)

(58) Field of Classification Search
CPC ......... G06F 16/24561; G06F 16/24573; G06F 16/248
See application file for complete search history.

(56) References Cited

U.S. PATENT DOCUMENTS

| 7,856,595 | B2 * | 12/2010 | Itani | G06F 16/84 715/234 |
| 10,430,035 | B2 * | 10/2019 | Richter | G06F 3/0483 707/737 |
| 10,694,071 | B2 * | 6/2020 | Matejka | G11B 27/102 707/737 |
| 2002/0128511 | A1 * | 9/2002 | Brand | C07C 231/12 564/196 |
| 2018/0189292 | A1 * | 7/2018 | Grace, Jr. | G06F 16/93 707/737 |
| 2018/0191506 | A1 * | 7/2018 | Vilvovsky | H04L 9/14 707/737 |

OTHER PUBLICATIONS

Extended European Search Report, dated Mar. 11, 2024, for European Patent App. No. 23204101.2, 9 pages.
Dharma Shukla et al.: "Schema-agnostic indexing with Azure DocumentDB", Proceedings of the VLDB Endowment; [ACM Digital Library], Assoc. of Computing Machinery, New York, NY, vol. 8, No. 12, Aug. 1, 2015 (Aug. 1, 2015), pp. 1668-1679, XP058072835, ISSN: 2150-8097, DOI: 10.14778/2824032. 2824065.

(Continued)

*Primary Examiner* — Yuk Ting Choi
(74) *Attorney, Agent, or Firm* — Sterne, Kessler, Goldstein & Fox P.L.L.C.

(57) ABSTRACT

Various embodiments for a data compression store and search system are described herein. An embodiment operates by receiving a query to search a plurality of documents. It is determined that the plurality of documents are stored in a compressed format comprising a plurality of shells and a plurality of snippets. A first snippet that includes the query identifier is identified, and a first shell including a reference to the first snippet is identified. A readable version of a first document of the plurality of documents is assembled from the first shell. The assembled readable version of the first document is provided responsive to the query.

20 Claims, 9 Drawing Sheets

(56) References Cited

OTHER PUBLICATIONS

Jeong Hee Hwang et al.: "Clustering XML Documents Based on the Weight of Frequent Structures", Convergence Information Technology, 2007. International Conference on, IEEE, Piscataway, NJ, USA, Nov. 21, 2007 (Nov. 21, 2007), 845-849, XP031225309, ISBN: 978-0-7695-3038-3.

Anonymous: "Ask HN: Is there a way to compress repeated JSON objects? I Hacker News", Jul. 4, 2016 (Jul. 4, 2016), pp. 1-3, XP093136543, Retrieved from the Internet: URL:https://news.ycombinator.com/item?id=12030327 [retrieved on Feb. 29, 2024].

* cited by examiner

```
206
Doc1:
{
    "customer": {
        "name": "Marcus",
        "address": {
            "street": "Main Street 100"
            "city": "Hamburg"
        }
    },
    "order": {
        "productID": 471100
    }
}
```

```
216
Doc1:
{
    Snippet1,
    Snippet3
}
```

208A
```
Snippet1:
"customer": {
    "name": "Marcus",
    Snippet2
}
```

208B
```
Snippet2:
"address": {
    "street": "Main Street 100"
    "city": "Hamburg"
}
```

208C
```
Snippet3:
"order": {
    "productID": 471100
}
```

FIG. 2A

DATA COMPRESSION, STORE, AND SEARCH SYSTEM

BACKGROUND

Data storage and maintenance are expenses for many organizations, both computationally and financially. As the amount of data being stored grows, these expenses also increase. The more data that is being stored, more data that has to be maintained and managed, and consequently the more storage capacity, computing resources, and personnel that will be required to maintain and manage the stored data. One way organizations can try and reduce the amount of data storage required is by using compression. However, compression has its own drawbacks, because compression often reduces the usability of the data by making searching and accessing the data slow and cumbersome, which can detrimentally impact efficiency and slow down the business of the organization.

BRIEF DESCRIPTION OF THE FIGURES

The accompanying drawings are incorporated herein and form a part of the specification.

FIGS. 2A-2D illustrate examples of compression, storage, and other processing operations that may be performed by DCS 102, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Data storage and maintenance are expenses for many organizations, both computationally and financially. As the amount of data being stored grows, these expenses also increase. The more data that is being stored, more data that has to be maintained and managed, and consequently the more storage capacity, computing resources, and personnel that will be required to maintain and manage the stored data. One way organizations can try and reduce the amount of data storage required is by using compression. However, compression has its own drawbacks, because compression often reduces the usability of the data by making searching and accessing the data slow and cumbersome, which can detrimentally impact efficiency and slow down the business of the organization.

Figure 1:
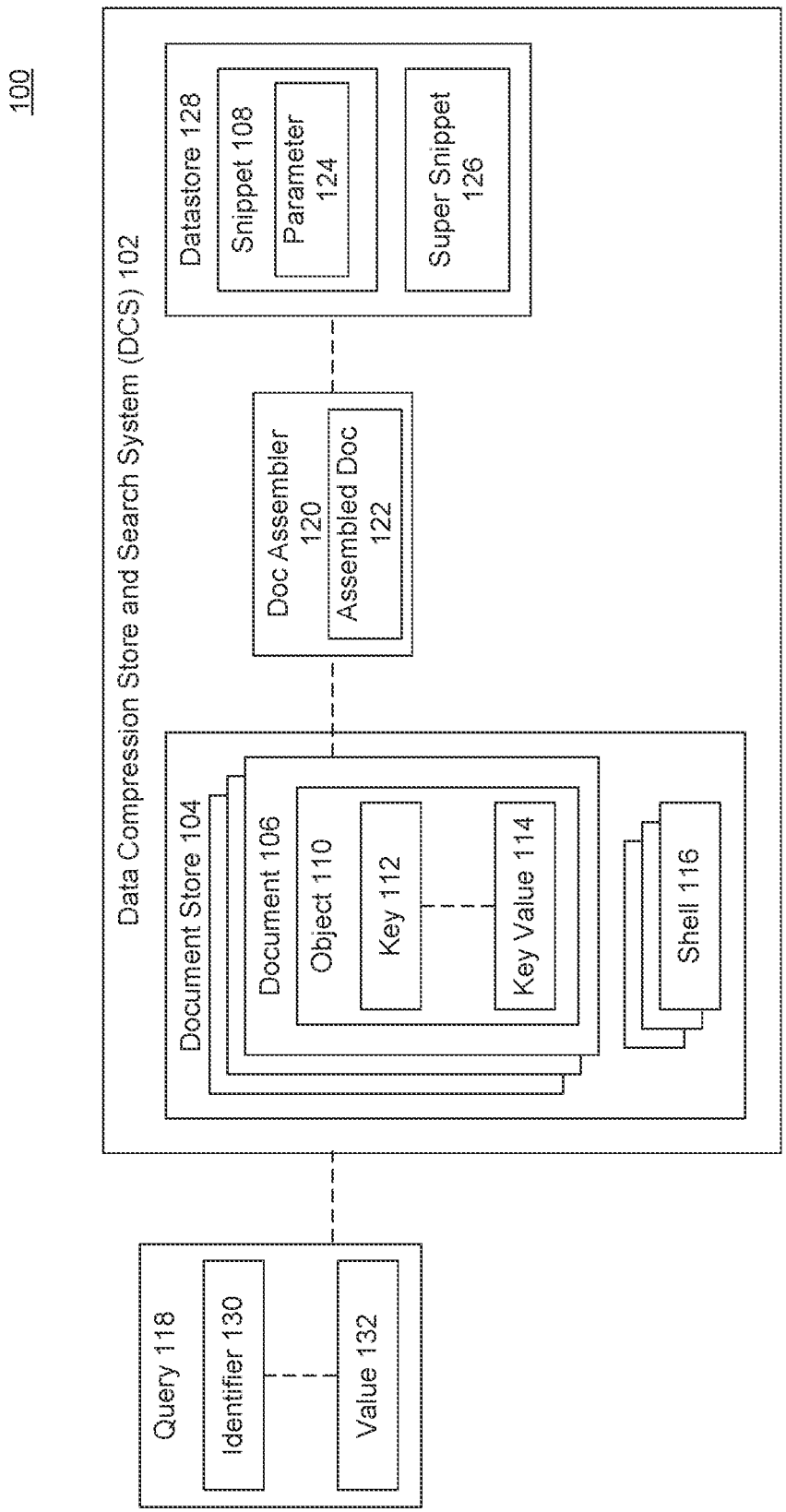
FIG. 1 is a block diagram illustrating a data compression store and search system (DCS), according to some example embodiments.

FIG. 1 is a block diagram 100 illustrating a data compression store and search system (DCS) 102, according to some example embodiments. In some embodiments, DCS 102 may provide efficient data compression techniques and formats, which both reduces the amount of storage capacity required to store the data (in an uncompressed format), while also providing for the usability of compressed data, by allowing for more efficient searching on the compressed data, and subsequent, efficient data access and decompression.

In some embodiments, DCS 102 may have or may have access to a document store 104. Document store 104 may include any set of memory, databases, servers, or other storage devices that are storing data, such as a set of documents 106. For simplicity, a small set of documents 106 is illustrated, however DCS 102 may process any number of documents 106, including millions or billions of documents 106 with the techniques and technologies described herein.

In some embodiments, document 106 may include a JSON (Javascript Objection Notation) formatted document. JSON is an example of a data format that allows for data exchange and communications between different computing devices, such as mobile devices operating web applications and servers. For simplicity, the examples described herein will focus on JSON documents, but one skilled in the art will appreciate other data storage formats, including but not limited to JSON, may be used for the documents 106. In some embodiments, the documents 106 may be sorted or arranged into different subsets, and each subset may have its own unique storage format.

In some embodiments, document 106 may include an object 110 and each object 110 may include one or more key-value pairs (illustrated as key 112 and key value 114). Object 110 may be a set of one or more key-value pairs. In some embodiments, a first object 110 may include additional or nested objects 110 inside of the first object 110. In some embodiments, document 106 may include multiple different objects 110, each with one or more key-value pairs.

Figure 2B:
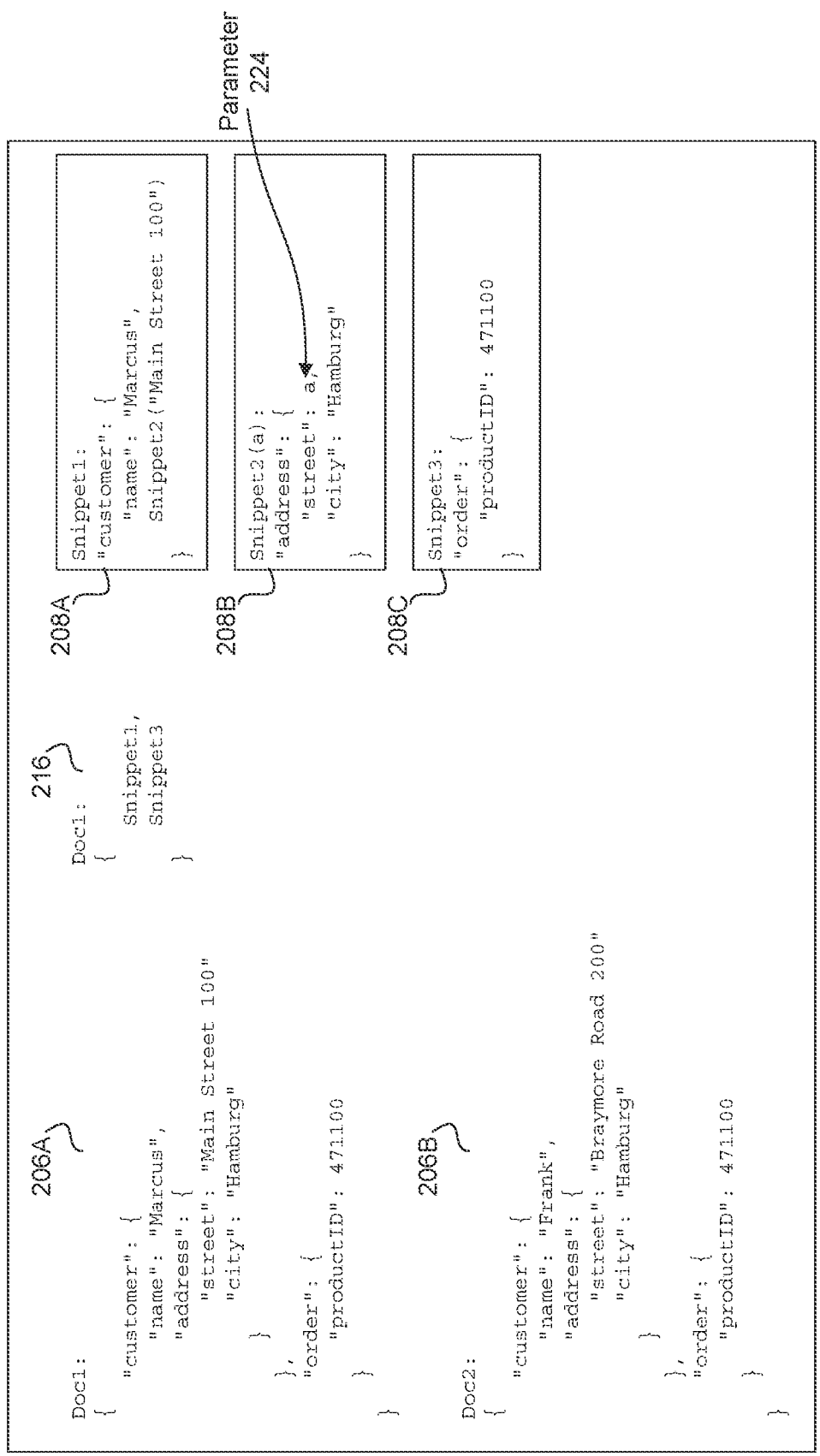

FIGS. 2A-2D illustrate examples of compression, storage, and other processing operations that may be performed by DCS 102, according to some embodiments. In FIG. 2A, the document 206, may be an example of document 106 (of FIG. 1). In document 206, the objects 110 may be customer, address, and order. In some embodiments, the object 110 may be similar to a key without a corresponding value.

The key-value pairs (comprising keys 112 and their corresponding key values 114) may be [street-"Main Street 100"], [city-"Hamburg"], and [productID-471100]. The illustrated document 206 may be a simple example of how customer information may be stored as a document 206.

Generally speaking JSON documents are individually stored in conventional systems, which makes compression impossible or inapplicable. While this separate and individual storage of different documents may allow for quick access to the content of the documents, the amount of storage required to store the JSON documents will often outweigh any gains that may be realized from storing full documents (e.g., without any compression or reuse), and as the number of documents increase, the cost of storage and maintenance of the documents continues to increase. Also, at a certain point, storing full documents can make searching more resource intensive as well. While it is possible to compress many documents using compression algorithms known from zip archives or similar, the consequence is that all of the compressed documents then have to be subsequently decompressed prior to searching for a specific document with a specific key-value pair.

Returning to FIG. 1, DCS 102 may reduce the cost of storage and maintenance by identifying redundancies amongst documents 106 in document store 104, generating one or more snippets 108 (which encapsulate those redundancies and are reusable across multiple different documents 106), and storing snippets 108 and shells 116 (instead of full documents 106) that still allow for efficient search and data access. DCS 102 reduces the cost of ownership, storage, maintenance, and even search of for data from documents 106 while simultaneously providing for efficient search and access to the data of the originally stored documents 106, which can be deleted or removed from document store 104 after the generation of a corresponding shell 116.

Snippet 108 may indicate a redundancy that DCS 102 has identified across two or more of the documents 106 (or multiple portions of a single document). The redundancy which may be captured in a snippet 108 may include repeated objects 110, repeated data values, repeated keys 112, repeated key values 114, and/or repeated key-value pairs. The snippets 108 may be used across different documents 106 and enable the reuse of data, and enables redundancies to be deleted from storage thus saving storage space and maintenance costs.

Shell 116 may include a structure or arrangement of data and/or snippets 108 that can be used to assemble the original document 106. In some embodiments, DCS 102 may store shells 116 in document store 104 in lieu of the full versions of various documents 106 which may have been previously stored (which may include redundancies). In some embodiments, document store 104 may still include one or more documents 106 when there are no identified redundancies (e.g., snippets 108) in those documents 106.

Returning to FIG. 2A examples of snippet 108 are illustrated as snippets 208A-C (referred to generally as snippet 208). In the example illustrated, each snippet 208 may correspond to a different object 110 identified in document 206, and may include the object(s) 110, key(s) 112 and/or key value(s) 114 included in the corresponding object 110.

For example, snippet 208A includes the key-value pair of name-Marcus, but also includes a nested snippet, or reference to snippet 2 (snippet 208B). Snippet 208B includes the key-value pairs in the corresponding 'address' object 110 identified from document 206.

Shell 216 is an example of shell 116. Shell 216 is an example of what may be stored in document store 104 in lieu of document 206, which may be deleted after the generation of shell 216. Shell 216 includes references to two separate snippets (1 and 3, which correspond to snippets 208A and 208C respectively). As may be seen, from shell 216, snippets 208A-208C can be reassembled back into the original document 206 (which may have been removed or deleted from storage after the generation of shell 216).

Returning to FIG. 1, in some embodiments, if a document access, search request, or other query 118 is received for document 106 for which a corresponding shell 116 has already been generated and the document 106 removed from storage, a document assembler 120 may identify the corresponding shell 116 and may re-assemble the document 106 from shell 116 as assembled document 122. Assembled document 122 may visually appear identical to and/or include identical information as the original document 106.

For example, in FIG. 2A, document assembler 120 may identify and begin assembling document 206, from shell 216. From shell 216, it may be seen that the first part of the document 206 may include the data, text, and structure from snippet 208A ('snippet 1'), followed by snippet 208C ('snippet 3').

Snippet 208A includes a reference to snippet 208B which document assembler 120 may import into the snippet 208A (replacing the reference to "Snippet2"), followed by the text and data of snippet 208C ('snippet 3'). This snippet form of compression captures text and data, as well as the structure of document 106, including both additional punctuation and spacing, and other elements of structure of document 106, across one or more objects 110. Data assembler 120, from shell 216, may generate an assemble document 122 which may be or appear identical to the originally stored document 206.

Figure 2C:
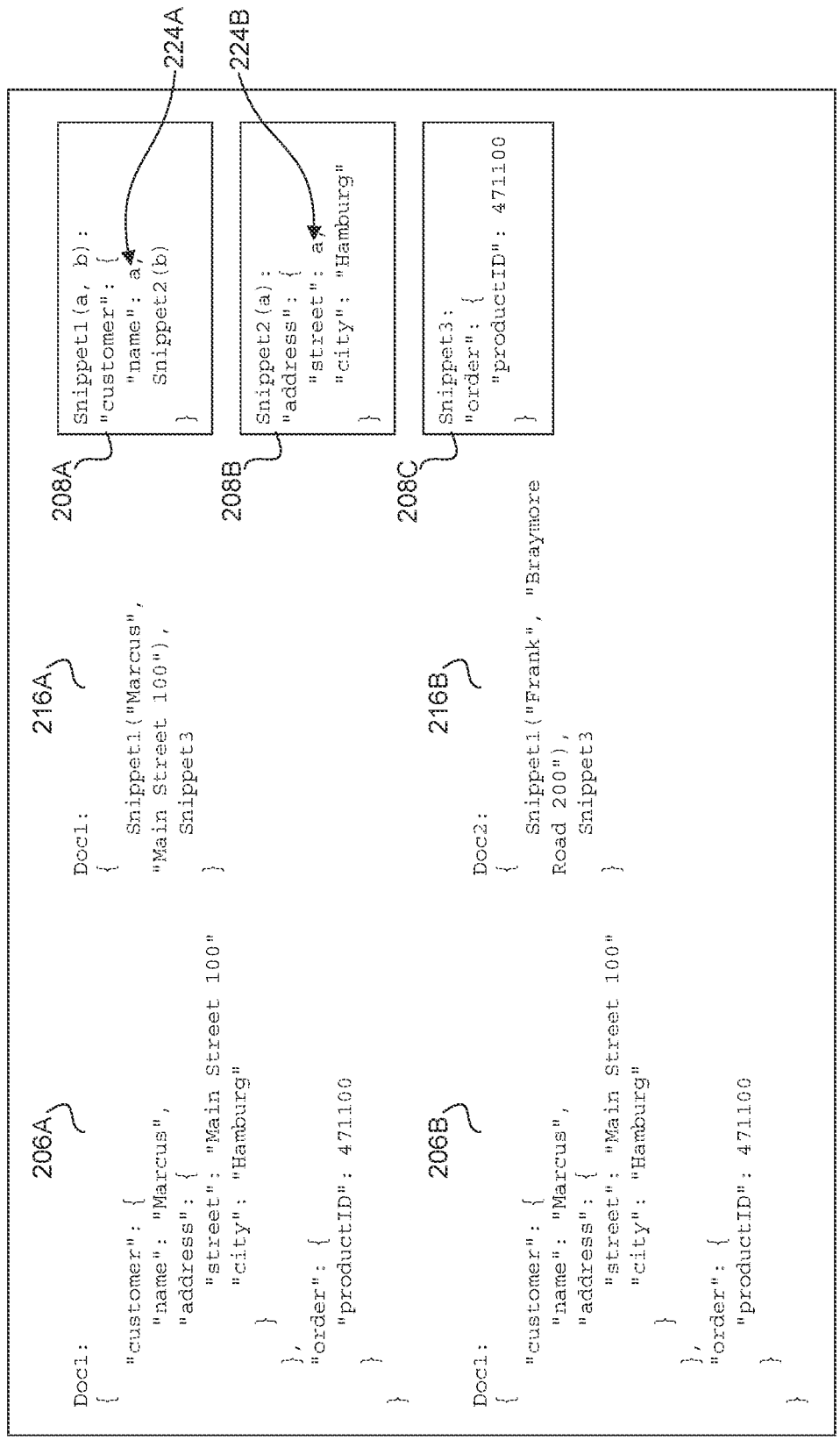
Figure 2D:
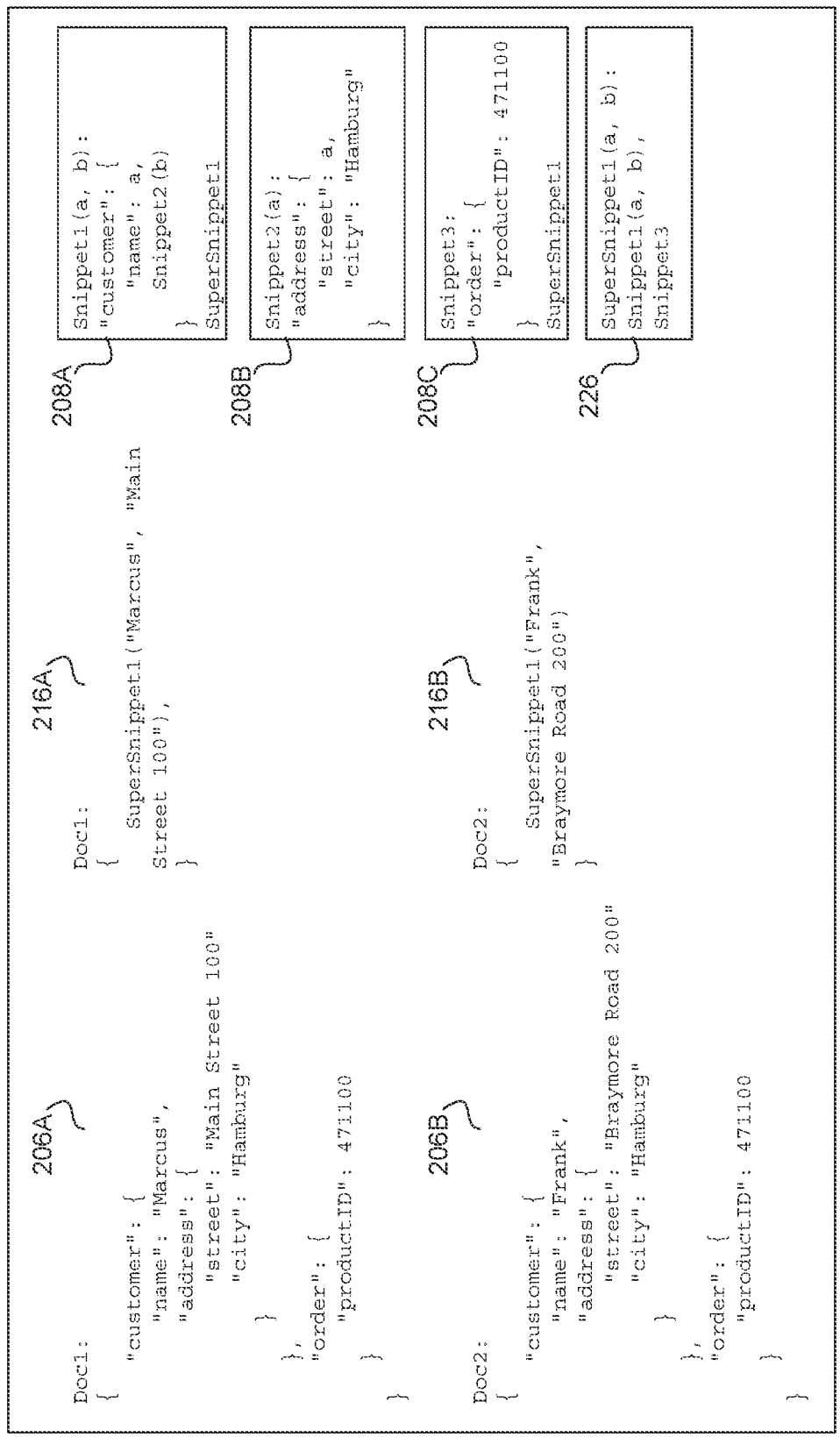

FIG. 2B to FIG. 2D illustrate a step-by-step example of how a second document 206B is being added by the assembler 120 to the snippets 108, and the use super snippets 126 and shells 116. FIG. 2B is similar to FIG. 2A, except that FIG. 2B includes a second document 206B. Snippet 208B includes a modification, which now includes a parameter 224, which may be an example of parameter 124 of FIG. 1. Parameter 124 may be a variable that is passed to a snippet 108 that is used as a key value 114 within the snippet 108.

As may be seen document 206A (which is the same as document 206 from FIG. 2A, just re-labeled) and document 206B, may both include an address object 110, which includes the key 112 street, and key-value pair of city-Hamburg. However, DCS 102 may detect that the values 114 for street may be different. To account for this difference, and maximize or increase the reusability of snippet 208B which includes the street key 112, DCS 102 may replace the actual key value 114 with a variable or parameter 224 "a". By using parameter 224, DCS 102 allows snippet 208B to be reused with different values for parameter 224 "a" across different documents (206A, 206B).

FIG. 2C is similar to FIG. 2B, except that FIG. 2C includes increased compression with a new parameter 224A and a new shell 216B, as generated by DCS 102. For example, as illustrated, DCS 102 has identified a new parameter 224A to account for the varying values for the key 112 name, in the two documents 206A, 206B.

As can be seen in shells 216A and 216B, the calls to snippet 1 include values to be used in the various parameters 224A and 224B in snippets 208A and 208B.

FIG. 2D is similar to FIG. 2C, except that FIG. 2D includes an increased compression via a new super snippet 226, as generated by DCS 102. DCS 102 may detect that both shells 216A, 216B (from FIG. 2C) have a similar structure or calls to similar snippets 208A-C. For example, both shells 216A, 216B include a reference to snippet 1 followed by a reference to snippet 3. These redundancies in calling the same snippets in the same order may be accounted for by DCS 102 by generating a super snippet 226 (which may be an example of super snippet 126 from FIG. 1). It can be appreciated that as the number of documents 106, 206 grows and the number of shells referring to particular snippets 208 and super snippets 226 grows, the savings in time, resources, and increase in efficiency grows as well.

A super snippet 126 may be a snippet that includes calls or references to other snippets 108, without any direct references to another (non-snippet) object 110, key 112, key value 114, or key-value pair. Super snippet 226 illustrates an example super snippet 126. As may be illustrated, super snippet 226 includes calls to snippet 1 and snippet 3, each of which may take parameters 124 'a', the values of which are provided in the shells 216A, 216B. Meanwhile, snippets 108 have a list of super snippets 126 that refer them. As you can see in FIG. 2D, with the introduction of super snippet 226, snippets 208A and 208C got enriched or further compressed with a reference to "SuperSnippet1".

As also illustrated, the use of a super snippet 226 further reduces how much data is stored for shells 216A and 216B (e.g., relative to the shells 216A, 216B illustrated in FIG. 2C). From shells 216A, 216B, document assembler 120 may regenerate or assemble both documents 206A and 206B in their original forms using the snippets 208A-C, and super snippet 226 which may be stored in a datastore 128 (as illustrated in FIG. 1), replacing the parameters 224A, 224B with the provided values. Datastore 128 may include any storage device(s) where snippets 108, parameters 124, and/or super snippets 126 are stored, modified, and accessed.

Figure 3A:
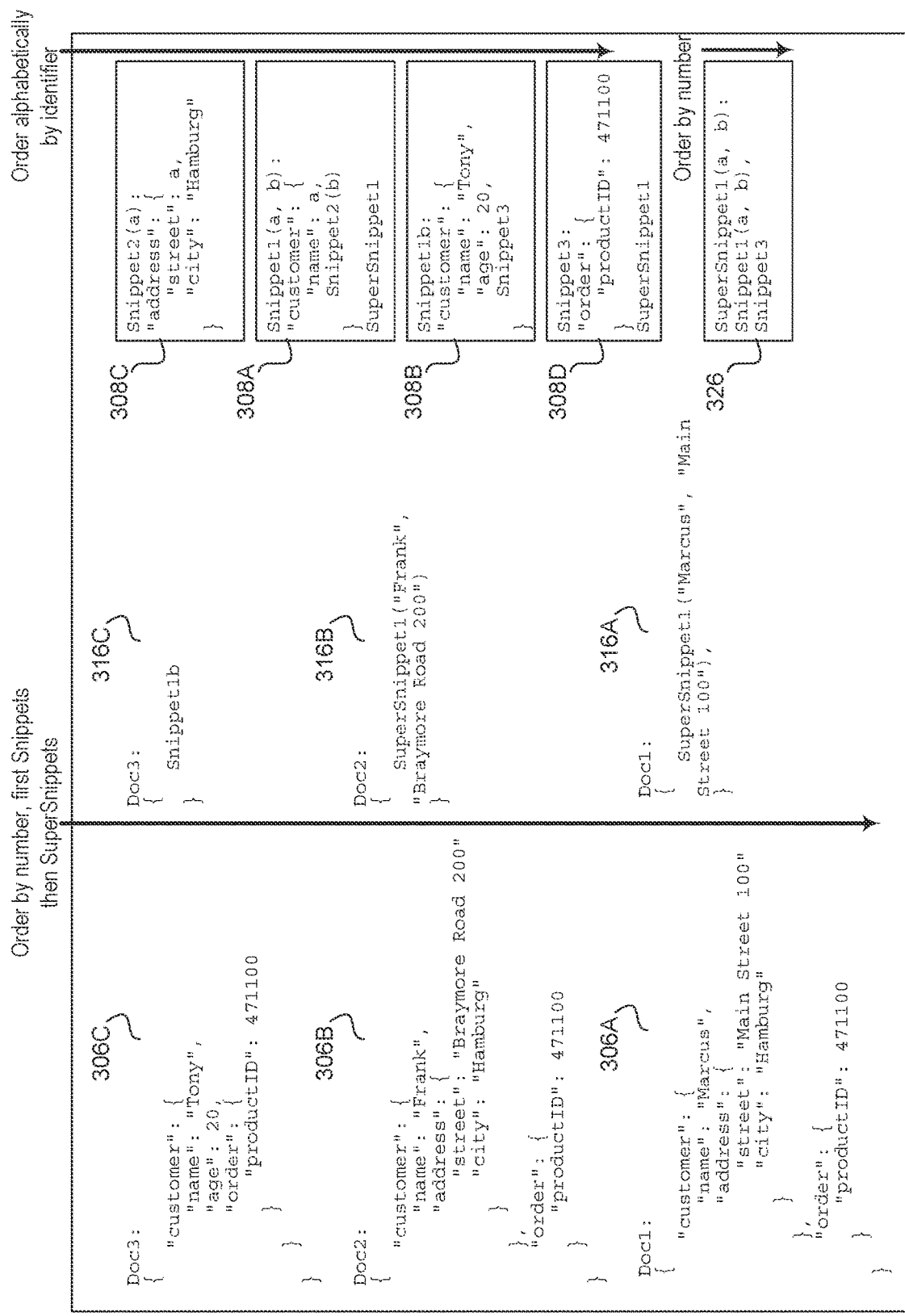
FIGS. 3A-3B illustrate example query operations of a data compression store and search system (DCS), according to some example embodiments.

FIG. 3A is similar to FIG. 2D, except that an additional document has been added, the snippets have been modified, and to increase the speed of the search, the shells and snippets and super snippets are ordered or sorted. Documents 306A-C are examples of original documents 106 and/or assembled documents 122 that may be later generated by document assembler 120, shells 316A-C are corresponding shells for the documents 306A-C. Snippets 308A-D are examples of snippet 108 and super snippet 326 is an example of super snippet 126 used to regenerate or assemble the original documents 306A-C.

In the example illustrated, once the snippets 308A-D, super snippet(s) 326 (if any), and shells 316A-C have been generated by DCS 102, from documents 306A-C, DCS 102 may order the shells 316A-C, snippets 308A-D, and super snippets 326 to improve the speed of searches or query processing that may be performed by DCS 102.

In the example illustrated, the shells 316A-C may be ordered based on which snippets and super snippets are being referred to in the shells. In the example illustrated, the first shell 316C may include a reference to a snippet without any references to a super snippet, so may appear first. If there are multiple shells without references to a super snippet, then those shells may be sorted numerically by the smallest snippet reference in those shells. For example, if a first shell includes a reference to snippet 2, and a second shell includes a reference to snippet 3 and snippet 1, the second shell may be arranged first because of the reference to snippet 1.

Snippets 316B and 316A may both include references to super snippet 1 (e.g., 326). But since both shells 316A, 316B include the same reference to super snippet 1, shells 316A and 316B may be ordered alphabetically by the first parameter (Frank v. Marcus), since there are no other snippets referenced in either shell.

DCS 102 may also order the snippets 308A-D alphabetically by their first referenced identifier or key 112. Since the super snippets 326 do not include identifiers or keys 112, they may be ordered separately after the snippets by their reference number or name. DCS 102 may be able to search super snippets 326 separately from snippets 308A-D. This alphabetic and numeric ordering of the shells 316A-C, snippets 308A-D, and super snippets 326 may make search and access (assembly) of documents 306A-C faster.

Figure 3B:
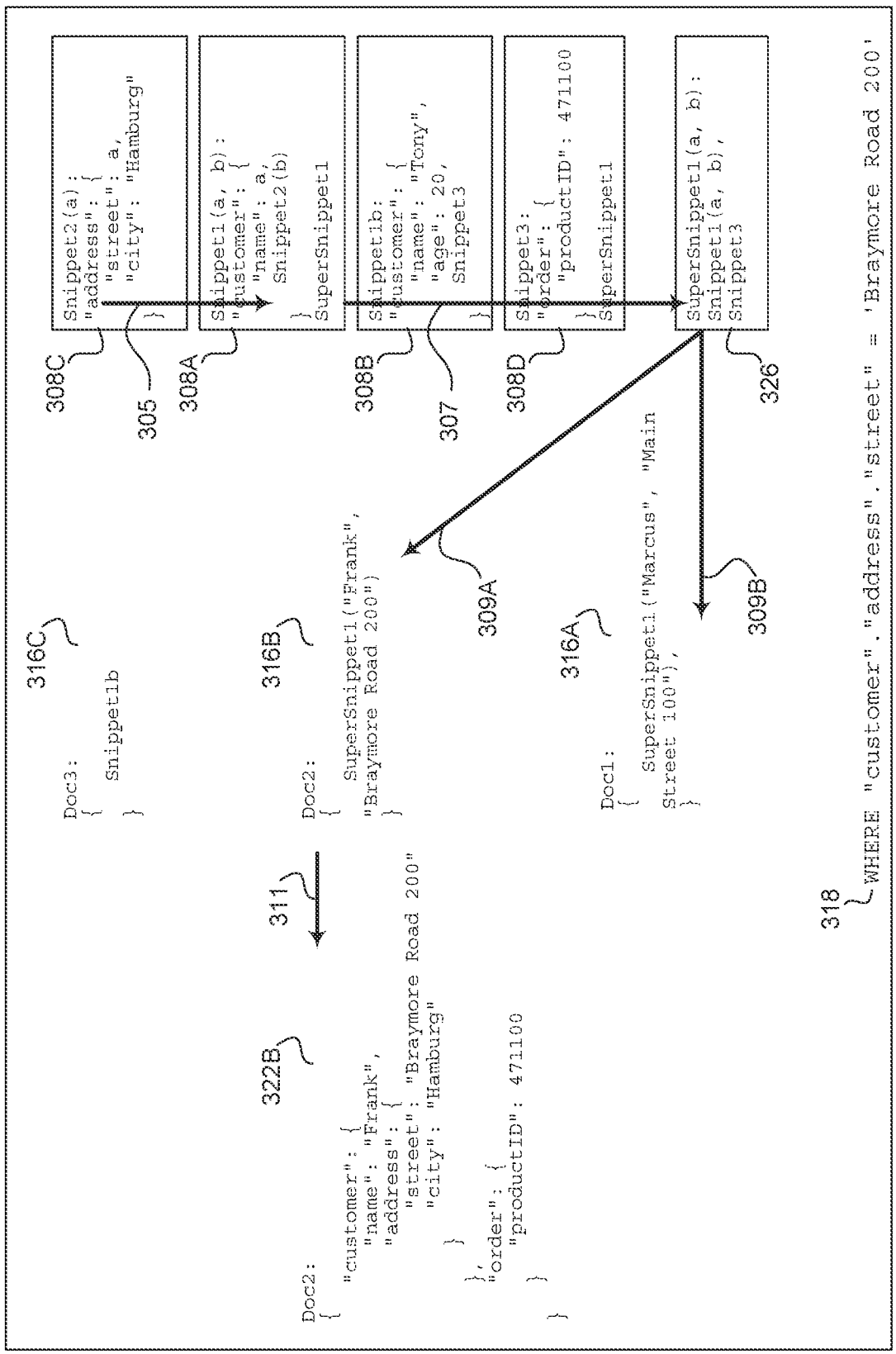

FIG. 3B illustrates the operations of a search functionality, responsive to a query 318, according to some example embodiments. Query 318 is an example of query 118, and may include both identifiers 130 and values 132. Identifiers 130 and values 132 may include what is being searched for through the query 118. In some embodiments, identifier 130 may correspond to an object 110 or key 112, and value 132 may correspond to a key value 114.

In the example query 318, the first identifier 130 may be "customer", referencing a "customer" object 110. DCS 102 may search the datastore 128 for the first identifier 130 ("customer") of the query 318. DCS 102 may identify that both snippet 308A and 308B include the "customer" identifier 130 from query 318. This search is made faster because, as described above with respect to FIG. 3A, the snippets 308A-D have been alphabetically ordered and hence logarithmic search may be applied.

The next identifier 132 may be the "address" object 110, for which DCS 102 may perform a search of the snippets 308A-D in datastore 128. DCS 102 may identify that the "address" object 110, as indicated in query 318, is in snippet 308C.

DCS 102 may then compare or cross-reference the results from the first search for the "customer" object as indicated by query 318, and with the second search for the "address" object, to identify any overlaps between the searches (e.g., any snippets that include both the "customer" and "address" objects). As indicated by arrow 305, snippet2(a) (308C that includes address) is referenced by snippet 1 (308A), and is not referenced by snippet 308B, so snippet 308B can be removed from the search results. Snippet 308A would be the resulting snippet including both the "customer" and "address" objects of query 318. In some embodiments, the shells may be searched for a reference to the outer "customer" snippet. In the given example, there is no such shell.

Arrow 307 indicates that snippet 1 (308A) is a child snippet of a super snippet 326. DCS 102 may determine then that the result will include super snippet 326. DCS 102 may then search the shells 316A-C stored in document store 104, which have been arranged in numerical order by first snippets and then super snippets as described above with respect to FIG. 3A. This ordering improves the speed of the search, especially as the number of shells 316 and/or documents grows.

As indicated by arrows 309A and 309B, DCS 102 may identify that both shells 316B and 316A meet the requirements of query 318 thus far, including super snippet 326. DCS 102 may then continue query processing in which the key-value pair of street-"Braymore Road 200" is being searched for amongst the shells 316B and 316A. DCS 102 may then determine that shell 316B satisfies the query 318. It may be seen that as a result of the sorting, searches may be executed with logarithmic complexity.

In some embodiments, DCS 102 may reassemble the original document 306B from shell 316, as an assembled doc 322B as indicated by arrow 311. For example, document assembler 120 may assemble document 322B from the corresponding snippets 308A-D and super snippets and values referenced by shell 316B. DCS 102 may then display or otherwise provide assembled doc 322B to another system for access or processing.

Figure 4:
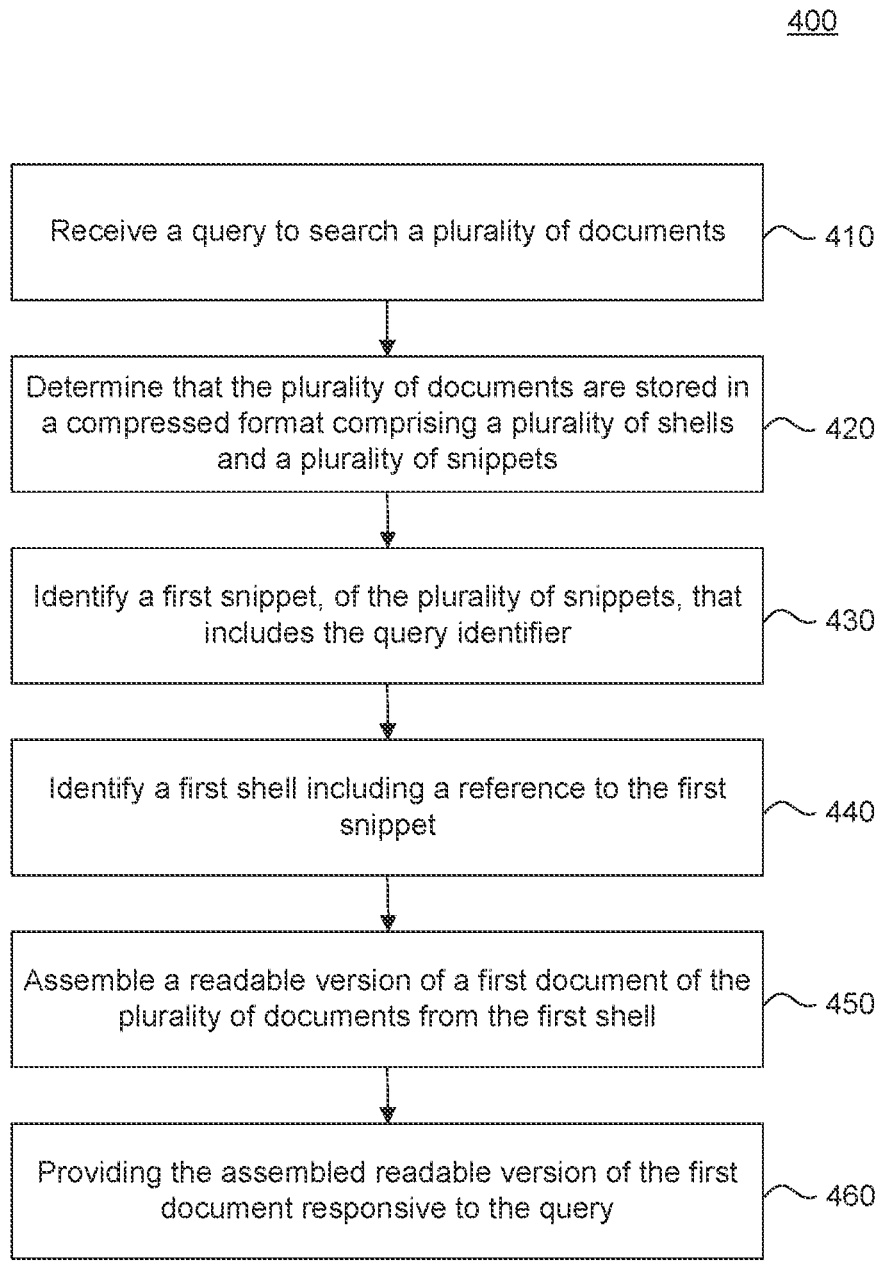
FIG. 4 is a flowchart illustrating a process for a data compression store and search system (DCS), according to some embodiments.

FIG. 4 is a flowchart 400 illustrating a process for a data compression store and search system (DCS), according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, a query to search a plurality of documents is received. For example, DCS 102 may receive query 118 to search the content of documents 106. The query 118 may include a query identifier 130 and a query value 132 corresponding to the query identifier 132. Another example query 318 is illustrated on FIG. 3B.

In 420, it is determined that the plurality of documents are stored in a compressed format comprising a plurality of shells and a plurality of snippets. For example, DCS 102 may determine that document store 104 includes shells 116, in lieu of documents 106. DCS 102 may also determine that data store 128 includes a plurality of snippets 108. The snippets 108 may correspond to one or more detected or identified objects 110 and/or keys 112 from the previously stored documents 106.

In some embodiments, each snippet 108 may correspond to an object 110 that has been used across two or more of the originally received or stored documents 106. In other embodiments, another threshold may be used. For example, if there were one million original documents 106, the threshold for reuse (for which DCS 102 may generate a corresponding snippet 108) may be a higher number, such as ten. In some embodiments, DCS 102 may perform an initial scan of the various available documents 106 to identify any and all redundancies that meet any corresponding thresholds. Each of the shells 116 may include references to one or more of the snippets 108 and/or the super snippet(s) 126.

In 430, a first snippet, of the plurality of snippets, that includes the query identifier is identified. For example, in FIG. 3B, snippets 308A and 308B both include the query identifier "customer" and snippet 308C includes the query identifier "address. DCS 102 may further determine that super snippet 326 includes the various query identifiers from query 318.

In 440, a first shell including a reference to the first snippet is identified. For example, DCS 102 may identify both shells 316A and 316B includes the identified super snippet 326, DCS 102 may then identify that shell 316B includes the query value from query 318.

In 450, a readable version of a first document of the plurality of documents is assembled from the first shell. For example, DCS 102 may assemble document 322B from shell 316B and the references super snippet 326 and various other snippets 308A-C, plugging into the identified values for any parameters 124.

In 460, the assembled readable version of the first document is provided responsive to the query. For example, DCS 102 may provide assembled document 122 back to the person, system, or device from which query 118 was received. In some embodiments, assembled document 122 may be provided to a system for display, or use in other processing tasks.

Figure 5:
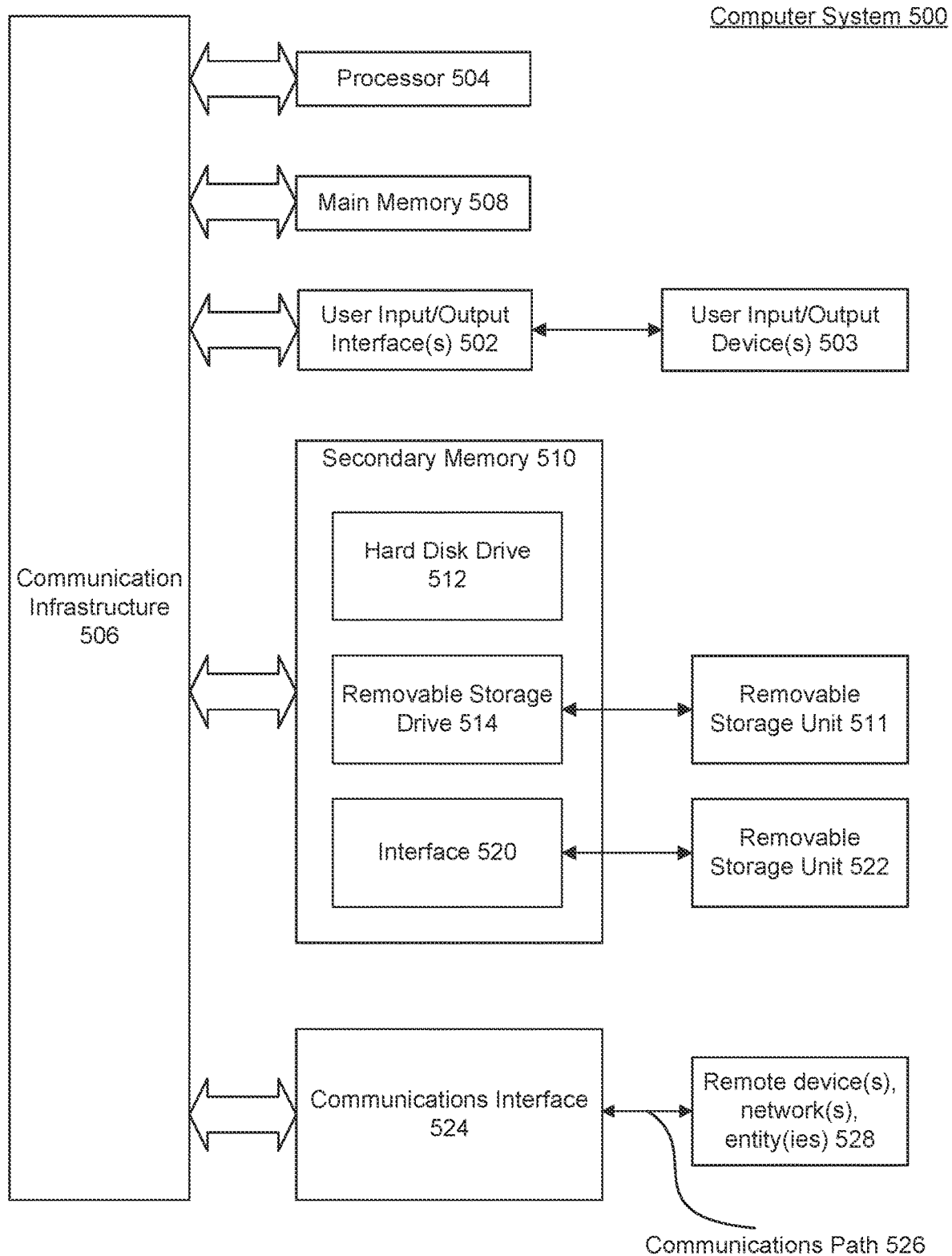
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 can be used to implement any embodiments, and/or any combination or sub-combination thereof.

Computer system 500 includes one or more processors (also called central processing units, or CPUs), such as a processor 504. Processor 504 is connected to a communication infrastructure or bus 506. Computer system 500 may represent or comprise one or more systems on chip (SOC).

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, memory card, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   receiving a query to search a plurality of documents, wherein the query comprises a query identifier and a query value corresponding to the query identifier;
   determining that the plurality of documents are stored in a compressed format comprising a plurality of shells and a plurality of snippets, wherein each of the plurality of snippets comprises an object included in two or more of the plurality of documents, and wherein each of the plurality of shells references at least one of the plurality of snippets;
   identifying a first snippet, of the plurality of snippets, that includes the query identifier;
   identifying a first shell including a reference to the first snippet, wherein one of the first shell or the first snippet includes the query value;
   assembling a readable version of a first document of the plurality of documents from the first shell, wherein the readable version of the first document includes the first shell, the query identifier, and the query value; and
   providing the assembled readable version of the first document responsive to the query.

2. The method of claim 1, wherein the identifying the first snippet comprises:
   determining that the plurality of snippets is arranged in alphabetical order; and
   searching the plurality of snippets for the query identifier.

3. The method of claim 2, wherein the plurality of snippets include a super-snippet comprising a second snippet of the plurality of snippets that comprises references to a subset of the plurality of snippets.

4. The method of claim 3, wherein the super-snippet includes reference to the first snippet.

5. The method of claim 4, wherein the assembling comprises assembling the readable version of the first document from the first shell which references the super-snippet.

6. The method of claim 1, wherein the identifying the first snippet comprises:
   identifying two or more snippets of the plurality of snippets including the query identifier;
   determining a second query identifier from the query;
   identifying a second snippet of the plurality of snippets including the second query identifier;
   identifying the first snippet from the two or more snippets, wherein the first snippet includes the second query identifier.

7. The method of claim 6, wherein the first snippet includes a reference to the second snippet.

8. The method of claim 7, wherein the assembling comprises:
   assembling the readable version of the first document based on both the first snippet and the second snippet.

9. A system comprising at least one processor, the at least one processor configured to perform operations comprising:
   receiving a query to search a plurality of documents, wherein the query comprises a query identifier and a query value corresponding to the query identifier;
   determining that the plurality of documents are stored in a compressed format comprising a plurality of shells and a plurality of snippets, wherein each of the plurality of snippets comprises an object included in two or more of the plurality of documents, and wherein each of the plurality of shells references at least one of the plurality of snippets;
   identifying a first snippet, of the plurality of snippets, that includes the query identifier;
   identifying a first shell including a reference to the first snippet, wherein one of the first shell or the first snippet includes the query value;
   assembling a readable version of a first document of the plurality of documents from the first shell, wherein the readable version of the first document includes the first shell, the query identifier, and the query value; and
   providing the assembled readable version of the first document responsive to the query.

10. The system of claim 9, wherein the identifying the first snippet comprises:

determining that the plurality of snippets is arranged in alphabetical order; and searching the plurality of snippets for the query identifier.

11. The system of claim 10, wherein the plurality of snippets include a super-snippet comprising a second snippet of the plurality of snippets that comprises references to a subset of the plurality of snippets.

12. The system of claim 11, wherein the super-snippet includes reference to the first snippet.

13. The system of claim 12, wherein the assembling comprises assembling the readable version of the first document from the first shell which references the super-snippet.

14. The system of claim 9, wherein the identifying the first snippet comprises:

identifying two or more snippets of the plurality of snippets including the query identifier;

determining a second query identifier from the query;

identifying a second snippet of the plurality of snippets including the second query identifier;

identifying the first snippet from the two or more snippets, wherein the first snippet includes the second query identifier.

15. The system of claim 14, wherein the first snippet includes a reference to the second snippet.

16. The system of claim 15, wherein the assembling comprises:

assembling the readable version of the first document based on both the first snippet and the second snippet.

17. A non-transitory computer-readable medium having instructions stored thereon that, when executed by at least one computing device, cause the at least one computing device to perform operations comprising:

receiving a query to search a plurality of documents, wherein the query comprises a query identifier and a query value corresponding to the query identifier;

determining that the plurality of documents are stored in a compressed format comprising a plurality of shells and a plurality of snippets, wherein each of the plurality of snippets comprises an object included in two or more of the plurality of documents, and wherein each of the plurality of shells references at least one of the plurality of snippets;

identifying a first snippet, of the plurality of snippets, that includes the query identifier;

identifying a first shell including a reference to the first snippet, wherein one of the first shell or the first snippet includes the query value;

assembling a readable version of a first document of the plurality of documents from the first shell, wherein the readable version of the first document includes the first shell, the query identifier, and the query value; and providing the assembled readable version of the first document responsive to the query.

18. The non-transitory computer-readable medium of claim 17, wherein the identifying the first snippet comprises:

determining that the plurality of snippets is arranged in alphabetical order; and searching the plurality of snippets for the query identifier.

19. The non-transitory computer-readable medium of claim 18, wherein the plurality of snippets include a super-snippet comprising a second snippet of the plurality of snippets that comprises references to a subset of the plurality of snippets.

20. The non-transitory computer-readable medium of claim 19, wherein the super-snippet includes reference to the first snippet.

* * * * *